No. 786,848. PATENTED APR. 11, 1905.
R. S. SHELDON.
GRADING IMPLEMENT.
APPLICATION FILED JULY 2, 1904.
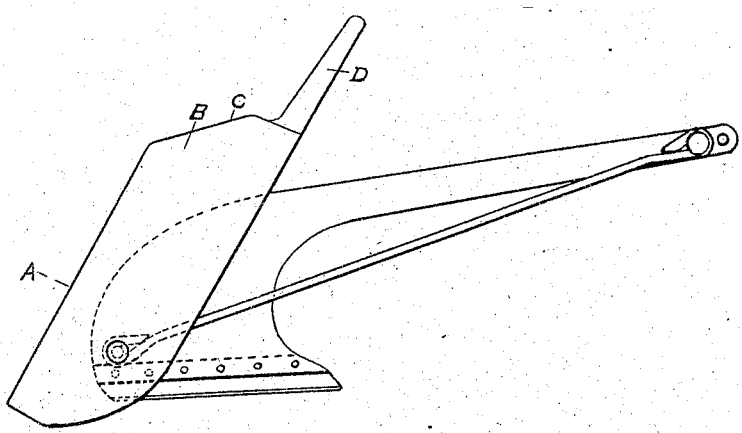
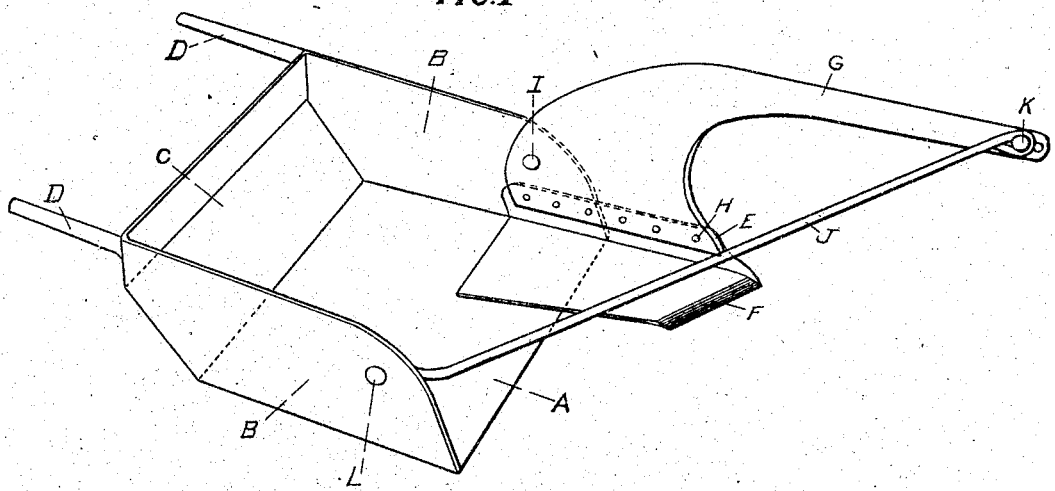

No. 786,848. Patented April 11, 1905.

UNITED STATES PATENT OFFICE.

ROSCOE S. SHELDON, OF WEST ALLIS, WISCONSIN.

GRADING IMPLEMENT.

SPECIFICATION forming part of Letters Patent No. 786,848, dated April 11, 1905.

Application filed July 2, 1904. Serial No. 215,097.

*To all whom it may concern:*

Be it known that I, ROSCOE S. SHELDON, a citizen of the United States, residing at West Allis, county of Milwaukee, and State of Wisconsin, have invented new and useful Improvements in Grading Implements, of which the following is a specification.

My invention relates to improvements in grading implements; and the same comprises a combined plow and earth-scoop.

The object of my invention is to provide an implement which will simultaneously loosen the earth and gather up the same in a scoop preparatory to being conveyed away to a place of deposit.

The construction of my invention is explained by reference to the accompanying drawings, in which—

Figure 1 represents a perspective view of the same in position for use. Fig. 2 represents a side view as the same appears in the act of dumping the contents of the scoop.

Like parts are identified by the same reference-letters in both views.

The scoop is substantially of ordinary construction, comprising the gathering-blade A, sides B B, connecting rear board C, and handles D D.

The device for loosening the earth comprises the vertical cutting-blade E, horizontal blade F, and the draw-beam G, to which a team is attached in the ordinary manner. The cutting-blades E and F are preferably formed integrally from a single piece of metal and are secured to the base of the beam G by a series of fastening blades or rivets H H, whereby when said cutting-blades become dull or worn they may be detached from the beam and replaced by others. The beam G is pivotally connected with one side of the scoop B by the bolt I and is connected with the other side of the scoop B by a brace-rod J and bolts K and L, the rod J being pivotally connected with the bolt L, whereby said scoop may when filled be emptied by turning the same forward from the position shown in Fig. 1 to that shown in Fig. 2. When the scoop is in the position shown in Fig. 2, the cutting-blades will be supported by the front end of the scoop above the surface of the ground, whereby they will be prevented from entering the ground as the scoop is being drawn forward by the team.

It will be understood that with this device a narrow strip of earth corresponding in width to substantially that of a furrow which is turned by an ordinary plow is cut and loosened at a time, the implement being drawn forward until the scoop is filled, when the blades are thrown from the ground by bearing downwardly upon the handles D until the scoop is drawn to the place of deposit. This being done, the scoop is dumped and emptied in the ordinary manner by throwing the handles forward, as indicated in Fig. 2.

While the form of device shown comprises, among other things, that class of scoops which is adapted to be drawn upon the surface of the ground, it is obvious that my device may be connected with the ordinary wheel-scoop or that class of scoops which is supported from wheels.

It will be understood that while with the ordinary scoop it is necessary to plow the ground preparatory to scraping the same with my device I am enabled to both plow and scrape the ground at the same time; that while with the ordinary scraper it is necessary to drive the team over the soft earth which has previously been plowed by my device the team has a solid surface to walk on at all times, whereby I am enabled not only to do more work in a given length of time, but such work is more easily accomplished.

While I have shown and described the plow as comprising vertical and horizontal blades arranged at right angles to each other, it will be understood that the exact relative arrangement of the cutting-blades is not material, providing, of course, that they be so arranged as to loosen the earth preparatory to the same being caught up by the scoop with which they are connected.

Having thus described my invention, what I claim as new, and desire to secure by Letters Patent, is—

1. The combination of a plow and an earth-scoop and means for pivotally connecting such plow and scoop together.

2. The combination of a plow, comprising a draft-beam; vertical and horizontal cutting-blades; a scoop; and means for pivotally connecting the plow and scoop together.

3. The combination of a scoop; a draft-beam, cutting-blades formed at right angles to each other and secured to said beam; a pivotal bolt connecting the rear end of said beam to one side of the scoop; a diagonal brace-bar rigidly connected at one end to the front end of said beam and pivotally connected at its rear end to the other side of said scoop, all substantially as set forth.

In testimony whereof I affix my signature in the presence of two witnesses.

ROSCOE S. SHELDON.

Witnesses:
JAS. B. ERWIN,
H. Z. TAUGHER.